US011424994B2

(12) United States Patent
Avasarala et al.

(10) Patent No.: US 11,424,994 B2
(45) Date of Patent: Aug. 23, 2022

(54) TRAFFIC-CONTROLLED PROCESSING OF APPLICATION REQUESTS

(71) Applicant: Fortuna Identity Inc, Fremont, CA (US)

(72) Inventors: Srikrishna Avasarala, Hyderabad (IN); Satish Kankati, Secunderabad (IN); Nityanjali Thummalachetty, New York, NY (US); Arjun Thummalachetty, New York, NY (US); Ronald Sebastian, Secunderabad (IN)

(*) Notice: Subject to any disclaimer, the term of this patent is extended or adjusted under 35 U.S.C. 154(b) by 0 days.

(21) Appl. No.: 16/747,841

(22) Filed: Jan. 21, 2020

(65) Prior Publication Data

US 2020/0366566 A1 Nov. 19, 2020

Related U.S. Application Data

(60) Provisional application No. 62/848,872, filed on May 16, 2019.

(51) Int. Cl.
*H04L 41/22* (2022.01)
*H04W 24/08* (2009.01)
(Continued)

(52) U.S. Cl.
CPC .......... *H04L 41/22* (2013.01); *H04L 43/0876* (2013.01); *H04L 67/02* (2013.01);
(Continued)

(58) Field of Classification Search
CPC ..... H04L 41/22; H04L 43/0876; H04L 67/02; H04L 67/16; H04L 67/325; H04L 67/327; H04L 67/34
(Continued)

(56) References Cited

U.S. PATENT DOCUMENTS 5,339,434 A 8/1994 Rusis
7,216,142 B2 * 5/2007 Whipple ............. H04L 67/2823
707/999.009

(Continued)

OTHER PUBLICATIONS

International Search Report and Written Opinion from corresponding International Application No. PCT/US2020/033471, dated Aug. 19, 2020 (23 pages).

*Primary Examiner* — James E Springer
*Assistant Examiner* — Patrick F Ngankam
(74) *Attorney, Agent, or Firm* — Westman, Champlin & Koehler, P.A.

(57) ABSTRACT

A request processor includes a request handler and a traffic controller. The request handler is configured to communicate requests received from a source application to corresponding service providers over a network. Each of the requests defines a target action to be performed by the corresponding service provider on a target application. The traffic controller is configured to generate a user interface and perform one of a plurality of traffic control actions on each of the requests based on a user control input through the user interface. The plurality of traffic control actions includes allowing communication of a request to the corresponding service provider by the request handler, holding a communication of a request to the corresponding service provider, and turning back a request to the source application for manual fulfillment.

15 Claims, 5 Drawing Sheets

(51) Int. Cl.
   *H04L 43/0876* (2022.01)
   *H04L 67/02* (2022.01)
   *H04L 67/51* (2022.01)
   *H04L 67/63* (2022.01)
   *H04L 67/00* (2022.01)
   *H04L 67/62* (2022.01)

(52) U.S. Cl.
   CPC ............ *H04L 67/16* (2013.01); *H04L 67/325* (2013.01); *H04L 67/327* (2013.01); *H04L 67/34* (2013.01); *H04W 24/08* (2013.01)

(58) Field of Classification Search
   USPC ........................................................ 709/232
   See application file for complete search history.

(56) References Cited

U.S. PATENT DOCUMENTS

| | | | |
|---|---|---|---|
| 7,519,734 B1* | 4/2009 | Dumitriu | H04L 67/1002 718/105 |
| 2002/0046301 A1 | 4/2002 | Shannon et al. | |
| 2006/0031286 A1* | 2/2006 | Sagawa | G06Q 10/109 709/203 |
| 2007/0097996 A1* | 5/2007 | Millefiorini | G06Q 10/06311 370/401 |
| 2007/0118648 A1* | 5/2007 | Millefiorini | H04L 65/1063 709/225 |
| 2016/0112497 A1* | 4/2016 | Koushik | H04L 67/10 715/739 |

* cited by examiner

TRAFFIC-CONTROLLED PROCESSING OF APPLICATION REQUESTS

CROSS-REFERENCE TO RELATED APPLICATION

The present application is based on and claims the benefit of U.S. provisional patent application Ser. No. 62/848,872, filed May 16, 2019, the content of which is hereby incorporated by reference in its entirety.

FIELD

Embodiments of the present disclosure generally relate to information technology based computerized systems and, more specifically, to the handling of information or action requests between computer applications and processes running on different computing systems.

BACKGROUND

In some information technology arenas, it is necessary for instructions and information to be exchanged between computer applications running on different systems. This information exchange may commence with an information request (hereinafter "request") that is generated by a source application. The request is transmitted by the request processor to the service provider, which processes the request by performing one or more actions defined by the request on a target application. Once the requested action is completed, the service provider may report the fulfillment of the request including any requested information to the request processor.

Faults may occur within the service providers and the target applications that prevent the fulfillment of requests. When this occurs, the continued submission of requests to the faulty service provider or target application generally continue to be unfulfilled. As a result, the continued submission of such requests unnecessarily incumbers processing resources of the request processor, congests data communication pathways, and delays the manual fulfillment of the requests.

SUMMARY

Embodiments of the present disclosure relate to a request processor of an information technology based computerized system that is configured to handle requests from source applications, and methods of handling requests from source applications using the request processor. One embodiment of the request processor includes a request handler and a traffic controller. The request handler is configured to communicate requests received from a source application to corresponding service providers over a network. Each of the requests defines a target action to be performed by the corresponding service provider on a target application. The traffic controller is configured to generate a user interface and perform one of a plurality of traffic control actions on each of the requests based on a user control input to the user interface. The plurality of traffic control actions includes allowing communication of a request to the corresponding service provider by the request handler, holding a communication of a request to the corresponding service provider, and turning back a request to the source application for manual fulfillment.

In one embodiment of a method of handling requests from source applications using a request processor implemented in an information technology based computerized system, requests are received by a request handler of the request processor. Each of the requests defines a target action that is to be performed by a corresponding service provider. One of a plurality of traffic control actions are performed on one or more of the requests using a traffic controller of the request processor based on a user control input through a user interface. The plurality of traffic control actions includes allowing communication of the one or more requests to a corresponding service provider by a request handler of the system for processing of the one or more requests, holding communication of the one or more requests to the corresponding service provider, and turning back the one or more requests to the request generator for manual fulfillment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
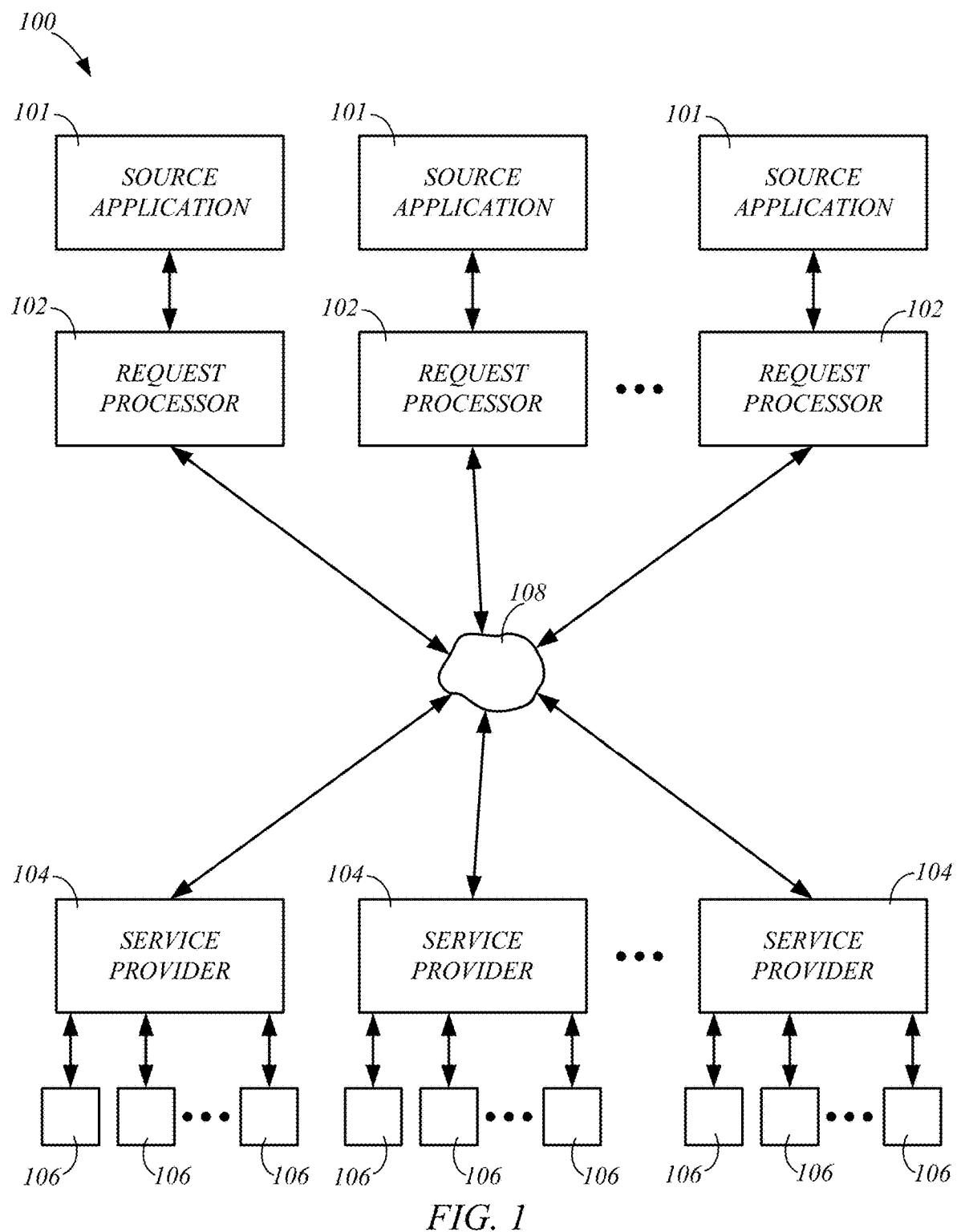
FIG. 1 is a simplified diagram of an exemplary information technology based computerized system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, embodiments of the present disclosure may be embodied as methods, systems, devices, and/or computer program products, for example. Accordingly, embodiments of the present disclosure may take the form of an entirely hardware embodiment, an entirely software embodiment or an embodiment combining software and hardware aspects. The computer program or software aspect of embodiments of the present disclosure may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory do not include transitory waves or signals.

Embodiments of the present disclosure generally relate to information technology based computerized systems, and facilitate the exchange of information and instructions through requests between computer applications and processes (hereinafter "applications") running on different computing systems. FIG. 1 is a simplified diagram of an exemplary information technology based computerized system 100 that includes multiple source applications 101, request processors 102 and service providers 104. Each of the request processors 102 may be an extension of a corresponding source application 101, which generate requests that define a target action to be performed by a corresponding service provider 104 on a target application 106 handled by the service provider 104. Each of the source applications 101, the request processors 102, service providers 104 and target applications 106 may include programs or program modules that perform the functions described herein in response to the execution of program instructions stored on computer-readable media or memory.

Examples of source applications 101 include applications that may be implemented on information technology based computerized systems, such as helpdesk systems and ticketing systems, identity and access management systems, inventory management systems, and other information technology systems. Exemplary service providers 104 include database systems augmented with trigger-based automation or manual fulfilling, systems that automate requests through programmed (either through programming or scripting languages) processes, screen scraping technology-based systems or robotic process automation systems, workflow engines, identity and access management systems, helpdesk systems and ticketing systems, service oriented architecture systems, artificial intelligence-based systems, and other systems.

Each request processor 102 is configured to handle communicating the requests to a corresponding service provider 104 based on one or more target actions defined in the request. The service provider 104 may process a request received from a request processor 102 in accordance with the defined target actions to perform the target actions on or using the corresponding target application 106. The service provider 104 may update the request processor 102 with a notification that the target actions have been completed. When the target action involves the provision of information from the target application 106, the service provider 104 communicates the information to the request processor 102, which can relay the information to the source application 101 that generated the request.

For example, a request may relate to a source application 101 for performing a subscription process, such as a process for subscribing to a digital newspaper. The source application 101 may be associated with a request processor 102 of a source application 101 that is configured to generate requests for a new subscription ID. The request may target a subscription management application (target application 106) that is configured to issue new subscription ID's. Thus, the source application 101 generates the request and the request processor 102, possibly after processing the request, communicates the request to the service provider 106 corresponding to the target subscription management application 106. This communication can be performed in accordance with conventional data communication protocols, such as through a network 108. The service provider 104 completes the target action by obtaining or generating the requested subscription ID from the target subscription management application 106 and reports the requested subscription ID back to the request processor 102, such as over the network 108. The request processor 102 then sends the subscription ID to the source application 101, which may use the subscription ID in its performance of the subscription process.

Figure 2:
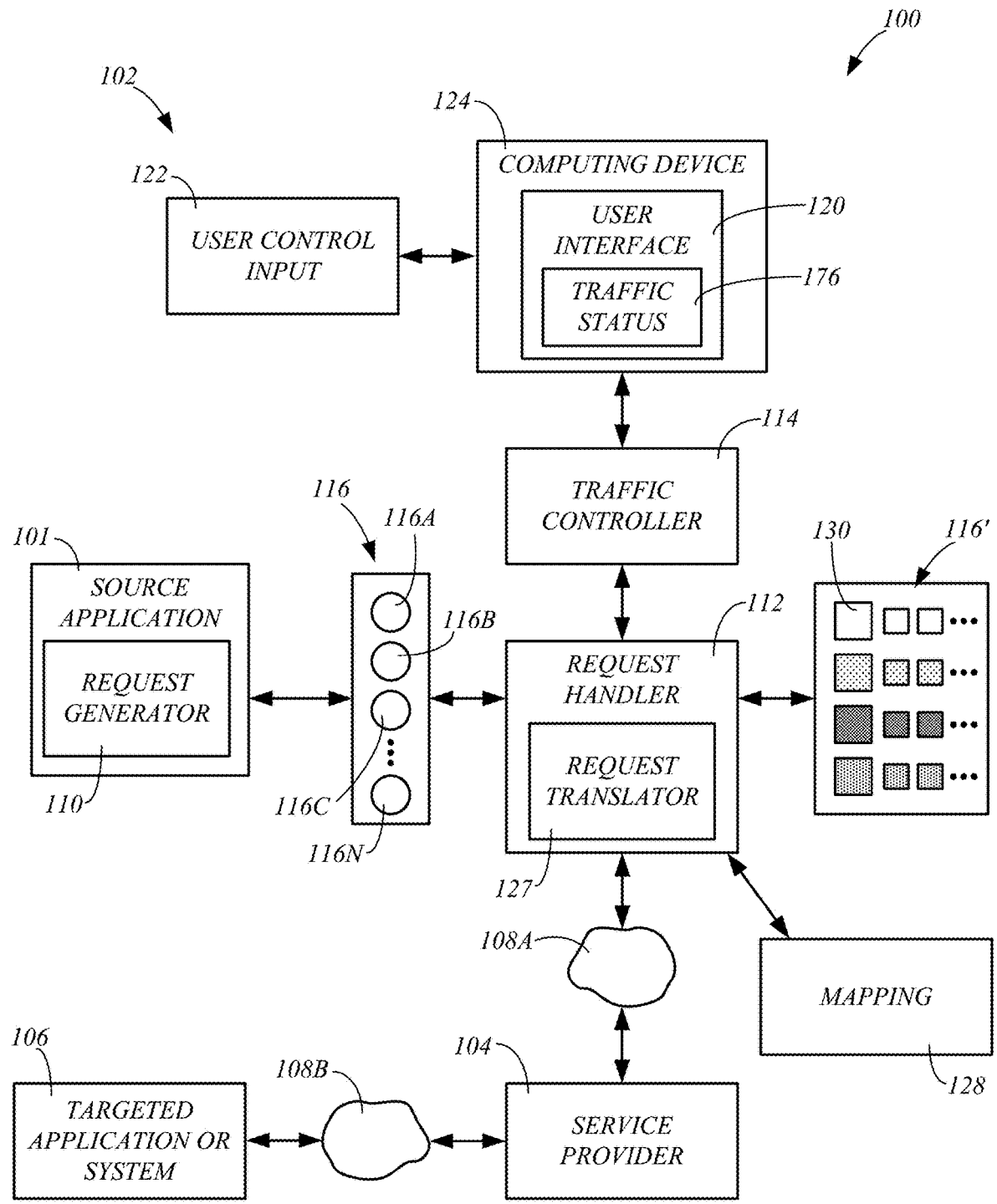
FIG. 2 is a simplified block diagram of an exemplary system comprising a request processor of a source application, in accordance with embodiments of the present disclosure.

FIG. 2 is a simplified block diagram of an exemplary system 100 comprising a request processor 102 of a source application 101, in accordance with embodiments of the present disclosure. In some embodiments, the source application 101 includes a request generator 110 that is configured to generate requests 116, such as requests 116A-N, each of which may define a target action to be performed by a service provider 104 on a target application or system 106, for example.

The request processor 102, which may be an extension to the source application 101, includes a request handler 112 and a traffic controller 114. The request handler 112 is configured to receive the requests 116 from the source application 101 and communicate the requests 116 to the corresponding service providers 104, such as over a network 108A, to enable the service providers 104 to process the requests 116 on corresponding target applications 106.

The traffic controller 114 is configured to generate a user interface 120 and perform traffic control actions on the requests 116 in response to user control input 122 received through the user interface 120. One objective of the traffic controller 114 is to automate the performance of the target actions or tasks of the requests 116 and reduce human efforts involved in completing the tasks. This results in time savings for the human administrator (e.g., user) of the system 100, reduces the need for dedicated computer hardware for administrators who do manual provisioning of target actions, automates the processes with improved efficiency, and eliminates or reduces the need for end-user training due to the user interface 120.

The user interface 120 may be provided by a computing device 124 and may include a graphical user interface presented on a display of the computing device 124, for example. The user control input 122, such as from a human administrator of the request processor 102, may be received by the user interface 120 using any suitable input device, including, for example, a keyboard, a mouse, and/or another input device.

As discussed below in greater detail, the traffic control actions that may be performed on each of the generated requests include allowing communication (e.g., pass, forward, etc.) of the request 116 to the corresponding service provider 104 by the request handler 112, holding (e.g., not communicating) the request 116 to the corresponding service provider 104, and turning back the request to the source application 101, such as to the request generator 110, for manual fulfillment. The communication of the request 116 to the service provider 104 allows the service provider 104 to proceed with completing the target action or actions defined by the request 116 on the target application 106, such as described above.

The traffic controller 114 may hold a request 116 to conserve processing resources of the request processor 102 and reduce data communication congestion between the request handler 112 and the service providers 104, such as when a fault is detected at the service provider 104 or the target application 106. The traffic controller 114 may turn the request back to the source application 101 for manual fulfillment (e.g., non-automated fulfillment), such as when it is unlikely that the request can be fulfilled by service provider 104 or the target application 106, for example.

Figure 3:
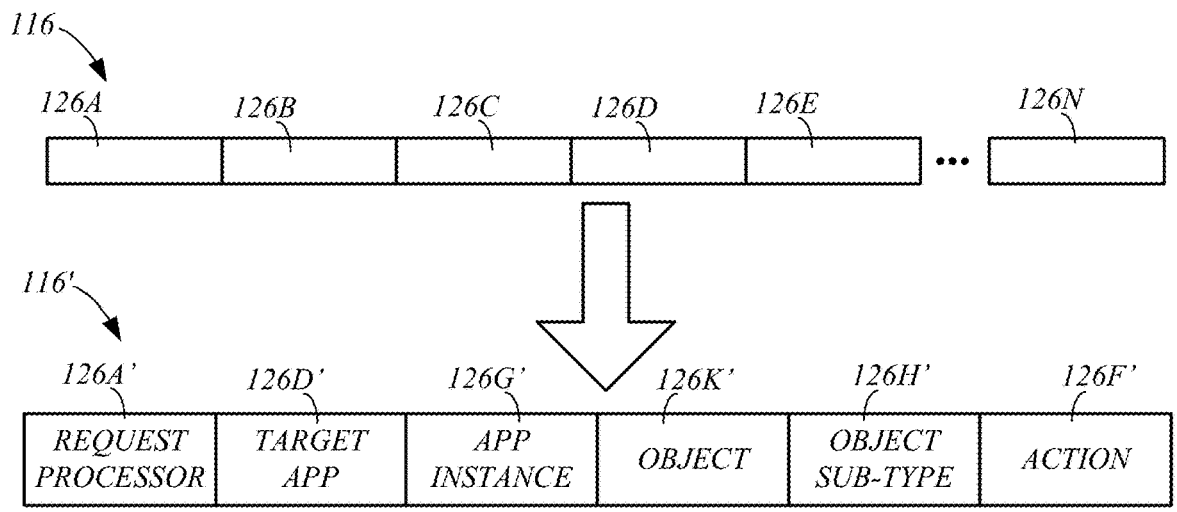
FIG. 3 is a simplified diagram of a request in a native and common request form, in accordance with embodiments of the present disclosure.

Each request 116 generated by the request generator 110, such as the request 116, shown in the simplified diagram of FIG. 3, may comprise a plurality of request parameters 126, such as parameters 126A-N. In some embodiments, the request handler 112 is configured to identify one of a plurality of request types for each of the requests 116 based on the request parameters 126. The request 116 generated by the request generator 110 may be forwarded to the service provider 104, which facilitates processing the request 116 by the target application 106 to perform the desired action.

In some embodiments, the request processor 102 may include a request transformer 127 that is configured to transform or translate each of the native requests 116 issued by the request generator 110 into a common request form 116'. The request translator 127 may be considered as a component of the request handler 112, as indicated in FIG. 2, or as a separate component of the request processor 102.

In some embodiments, the common request form 116' includes one or more of the request parameters 126 of the native request, such as indicated FIG. 3. However, the one or more request parameters 126 may be reorganized and converted to a different format to form the request 116'. Such a transformation or translation may be achieved through suitable frameworks like Java Jersey and Jackson combined, for example, or through another suitable technique. Thus, the request parameters 126' of the common request form may correspond to a subset of the request parameters 126 of the native request, as indicated in FIG. 3. The subset of the request parameters 126 of the native request 116 that form the common model request 116', as well as the order and format of the request parameters 126 included in the request 116', may be defined by an administrator of the system, such as through the user interface 120.

In some embodiments, the request parameters of the native or common request form include a request parameter (e.g., 126A') that identifies the request processor handling the request, a request parameter (e.g., 126D') that identifies the target application for the request, a request parameter (e.g., 126G') that identifies a target application instance for the request, a request parameter (e.g., 126K') that identifies an object of the target application instance, a request parameter (e.g., 126H') that identifies an object sub-type of the request, and/or a request parameter (e.g., 126F') that identifies an action of the request that is to be performed, for example. In one embodiment, the common request form consists of the request parameters 126', which may be organized in the order shown in FIG. 3.

The request parameter 126 or 126' identifying the request processor handling the request may identify the source application of information technology systems for which the native requests 116 are generated by the request generator 110, such as an inventory management system, through which a privileged smart card could be requested. The request parameter 126 or 126' identifying the target application may comprise a logical representation of the target application 106 for which the native request 116 has been generated. For example, when the request 116 involves an order for a smart card to be generated, the target application 106 may be a smart card generating application or system.

The request parameter 126 or 126' (e.g., 126A') identifying the target application instance may comprise a logical representation of one of the instances of the target application. For example, the request parameter 126 or 126' may identify the instance of the target smart card generating application that is dedicated for North America, rather than other instances of the target application that are dedicated to other world regions.

In some embodiments, the request handler 112 may use the target application request parameter 126 or 126' (e.g., 126D') to determine the corresponding service provider 104 that handles the identified target application 106 using a mapping 128 (FIG. 2) of the service providers 104 to the target applications 106, or another suitable reference for identifying the service provider 104 based on the identified target application 106 provided by the request parameter. The mapping 128 may carry information about the process on the service provider 104 that is to be triggered for the request 116.

The request parameter 126 or 126' (e.g., 126K') identifying the object of the target application instance may comprise a logical representation of the object in the target application instance for which the native request 116 has been generated. For example, the object of the target application instance could represent the smart card that needs to be prepared by the smart card generating application dedicated for North America.

The request parameter 126 or 126' (e.g., 126H') identifying the object sub-type may comprise a logical representation of a category of the object within the target application instance. For example, the object sub-type may identify a particular type of smart card that is to be prepared, such as a privileged smart card, a gold smart card, a regular smart card, or another type of smart card that is to be prepared by the smart card generating application dedicated for North America.

The request parameter 126 or 126' (e.g., 126F') identifying the action to be performed may comprise a logical representation of the action that has been requested within the native request. For example, the request parameter may identify an action of enabling or disabling the smart card that is being prepared by the smart card generating application dedicated for North America.

Thus, the common model requests 116' each include request parameters 126' that carry knowledge of its relationship with the corresponding native request 116. In some embodiments, either the native or common model request 116 or 116' may be forwarded to the corresponding service provider 104, which facilitates the processing of the request by the target application 106 (e.g., instance, object, etc.) to perform the action identified in the request parameters 126 or 126' (e.g., 126F'). Thus, the action may be performed within the system of the service provider 104 or in a third-party system that may receive the request through a network 108B, for example, as shown in FIG. 2.

Figure 4:
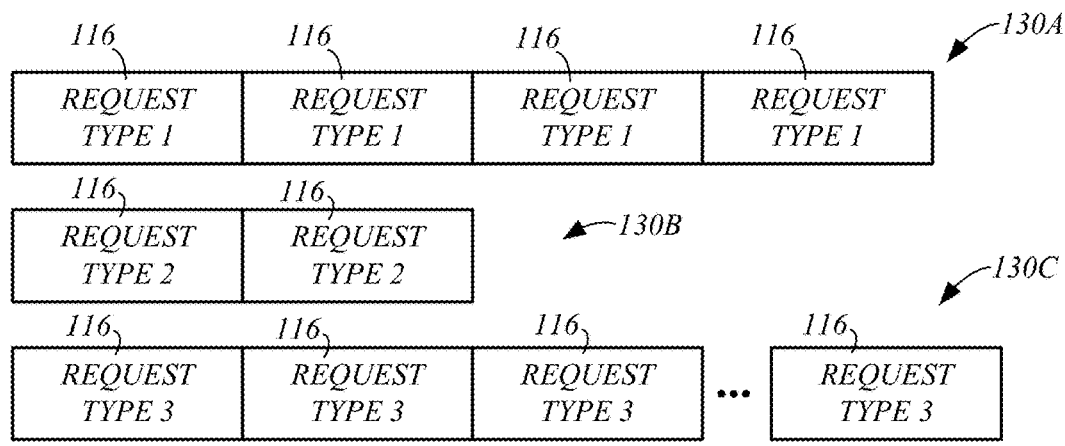
FIG. 4 is a simplified diagram of queues of requests, in accordance with embodiments of the present disclosure.

The request types may each be defined by a particular set of request parameters 126 or 126' (hereinafter request parameters 126), such that all requests 116 or 116' (hereinafter requests 116) of a given request type have the same request parameters 126. In some embodiments, the request handler 112 is configured to sort the requests 116 into queues 130 of requests 116 having the same request type, as shown in the simplified diagram of FIG. 4. For example, the request handler 112 may sort requests 116 of type 1 in a queue 130A, requests 116 of a type 2 in a queue 130B, and requests 116 of a type 3 in a queue 130C, as shown in FIG. 4.

Organizing the requests 116 having the same type into queues 130 can simplify the traffic control of the requests 116 by the administrator or user. For example, since each request 116 having the same type may have the same request parameters 126, each request 116 within a queue 130 may be generated by the same request processor 102, and have the same target application 106, target application instance, object of the target application, object sub-type, and/or the same action to be performed. If an exception or fault occurs with the service provider 104 or the target application 106, the administrator, through the user control input 122 to the user interface 120, can direct the traffic controller 114 to hold or turn back all of the requests 116 within the queue 130, rather than having to go through the process of holding each of the requests 116 individually. Thus, the efficiency at which the administrator may control the request traffic is improved through the use of the queues 130.

Figure 5:
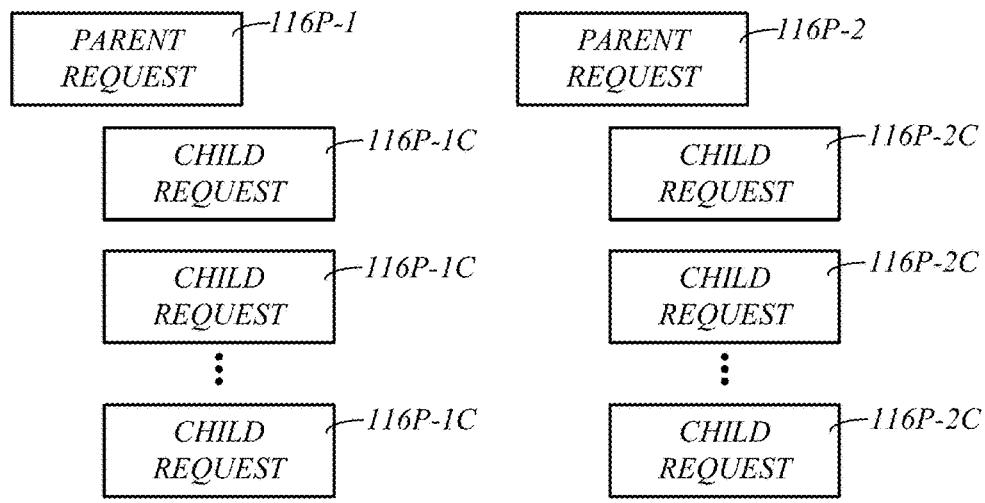
FIG. 5 is a simplified diagram of queues of requests that are organized in a hierarchical manner, in accordance with embodiments of the present disclosure.

In some embodiments, the administrator may organize the queues 130 of requests in a hierarchical manner based on user configurations, which may be input through the user interface 120. In one example, the request types may include a composite request type comprising a hierarchy of requests 116, in which a parent request 116P has child dependent requests. Thus, parent requests 116P-1 and 116P-2 may have multiple child requests 116P-1C and 116P-2C, respectively, that are dependent upon the parent requests, such as shown in the simplified diagram of FIG. 5. For example, an online banking application may generate a parent request relating to generating a user login for an account, which may have child requests in the form of a request for creating a user account an emailing a password to the user, a request for adding a membership of a "Retail User" role to the new account, a request for creating the account for the user with a partner bank that provides wealth management services, and a request to generate a smart (RFID) token for the user to support multifactor authentication.

As with the queues 130, the administrator, through the user control input 122 to the user interface 120, can direct the traffic controller 114 to hold, turn back, or pass all of the requests 116 of a composite request type, rather than having to go through the process of holding each of the requests 116 individually. Thus, the efficiency at which the administrator may control the request traffic is improved through the organization of the requests in the composite request type.

Figure 6:
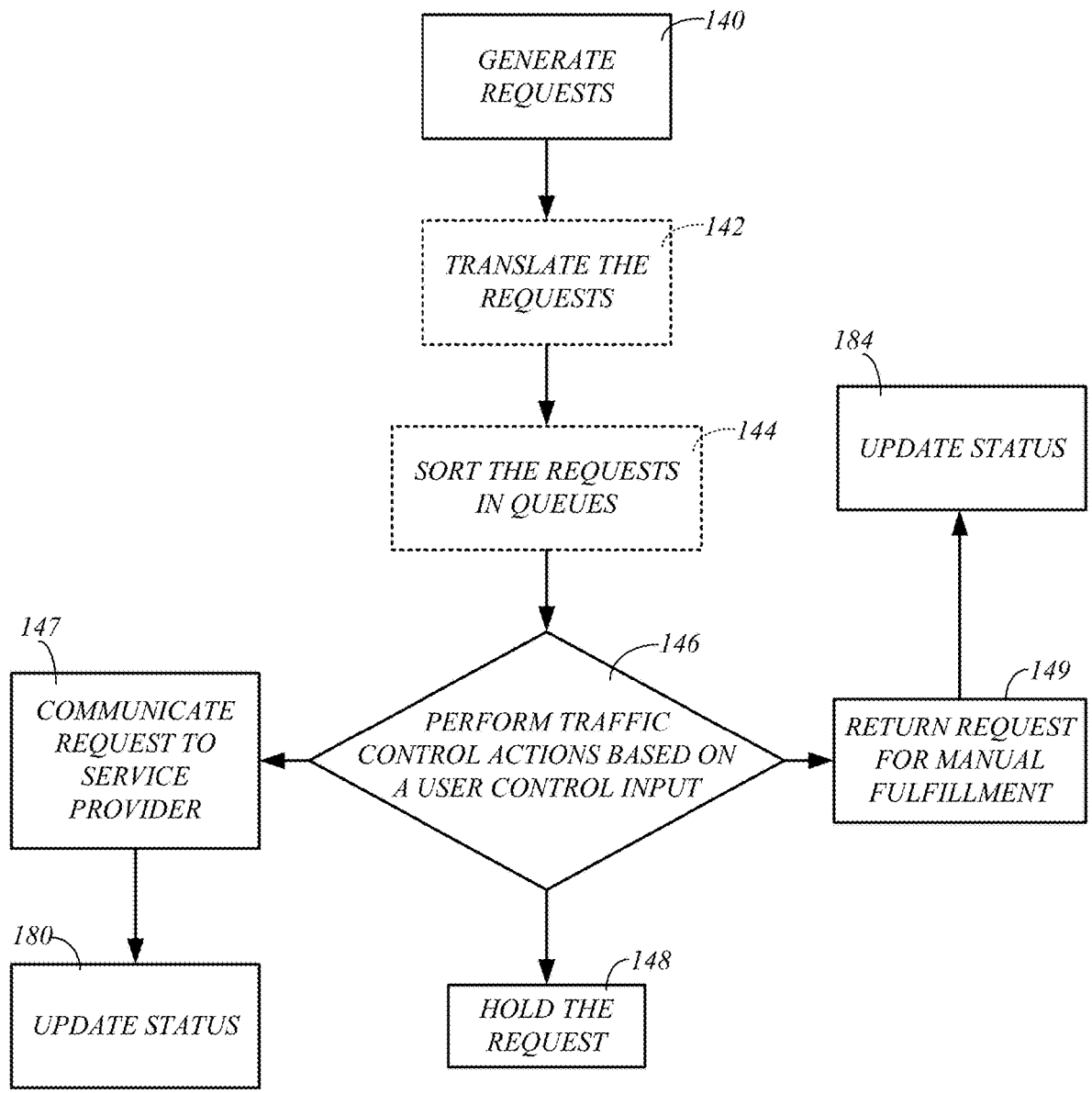
FIG. 6 is a flowchart of an exemplary method of handling requests of source applications using a request processor, in accordance with embodiments of the present disclosure.

FIG. 6 is a flowchart of an exemplary method of handling requests 116 of source applications 101 using a request processor 102, in accordance with one or more embodiments described herein. At 140 of the method, requests 116 (e.g., native format) are generated using the request generator 110 of the source application 101. In some embodiments, a request transformer 127 (FIG. 2) may translate the native requests 116 into the common request format 116', as indicated at 142, and as discussed above. The request handler 112 of the request processor may sort the requests 116 in their native or common format into queues 130 (FIG. 4), as indicated at 144.

At 146 of the method, the traffic controller 114 may perform traffic control actions on the requests 116 based on user control input 122 received through the user interface 120. In some embodiments, the traffic control actions include communicating or passing the requests 116 to the corresponding service provider 104, as indicated at 147, holding or not communicating the requests 116 to the corresponding service provider 104, as indicated at 148, or turning the requests 116 back to the source application 101, such as the request generator 110, for manual fulfillment, as indicated at 149. In some embodiments, the traffic controller 114 can perform these traffic control actions on the individual requests 116, a particular queue 130 of the requests 116, a complex type of request (group of parent and child requests)(FIG. 5), or all of the requests 116 being handled by the request processor 102.

Figure 7:
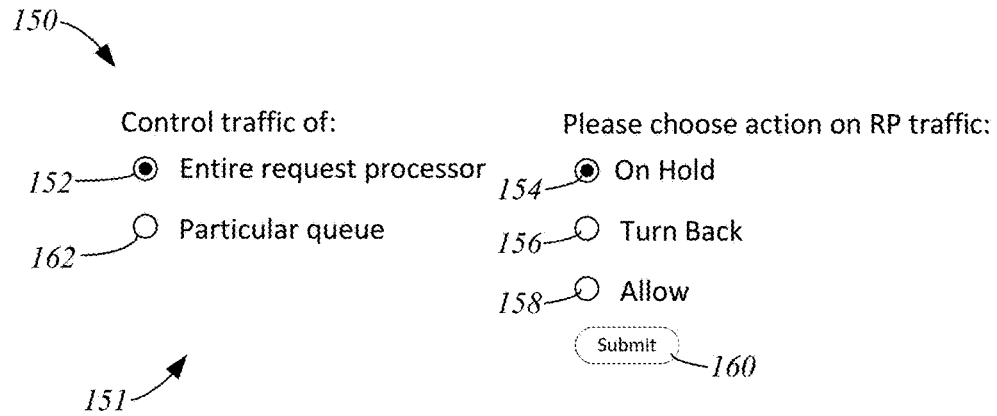
FIGS. 7 and 8 are exemplary graphical user interfaces, in accordance with embodiments of the present disclosure.

FIG. 7 is an exemplary graphical user interface (GUI) 150 that may be presented to an administrator by the user interface 120 for accepting user control input 122 to perform step 146 of the method. In one embodiment, the GUI 150 includes an interface or window 151 having an option 152 for controlling the traffic of the entire request processor 102. Along with the option 152 or after the option 152 is selected, the GUI 150 may display the traffic control actions that are available for the selection of the option 152, such as an option 154 to hold all of the requests 116 being handled by the request processor 102, an option 156 to turn back the requests 116 being handled by the request processor 102 for manual fulfillment by the request generator 110, and an option 158 to allow the requests 116 being handled by the request processor 102 to be communicated to the corresponding service providers 114. After selecting one of the options, the administrator may select the submit button 160 to submit the selected user control input 122 to the traffic controller 114.

The interface 152 of the GUI 150 may also include an option 162 to control the traffic of a particular queue 130 of the requests 116 being handled by the request processor 102. In some embodiments, when the option 162 is selected by the administrator, an interface or window is presented which may include a listing of the queues 130 of requests 116 being handled by the request processor 102, along with suitable control input options to allow the administrator to enter the user control input 122 to hold, turn back or pass a particular queue.

Figure 8:
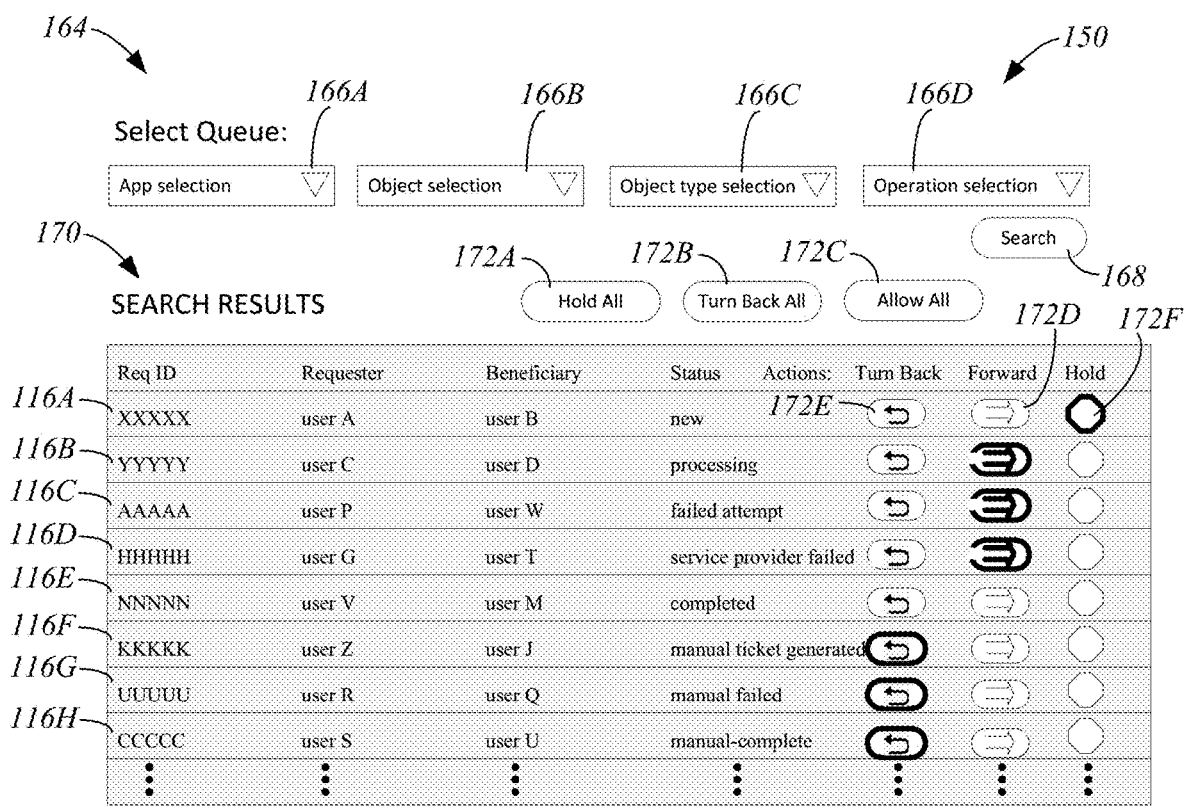

In one embodiment, the selection of the option 162 produces a search interface 164, an example of which is shown in FIG. 8. The interface 164 allows the administrator to search the queues 130 being handled by the request processor 102. Prior to the administrator entering a search input, the search interface 164 may display a listing of all of the queues 130 or requests 116 of requests being handled by the request processor 102.

One embodiment of the search interface 164 includes user search input options 166 that identify one or more request parameters for a search of the queues, as shown in FIG. 8. The search input options 166 may include dropdown menus or other data input items for designating specific request parameters for the search. For example, the search input options 166 may include an input option 166A for designating a target application request parameter, an input option 166B for designating an object request parameter, an input option 166C for designating an object sub-type request parameter, and an input option 166D for designating an action request parameter, and/or input options for designating another request parameter. Thus, the administrator may search for queues 130 of requests 116 having the same target applicant instance or other request parameter, for example. After the administrator designates the search parameters using the input options 166, the search may be executed by clicking the button 168. The traffic controller 114 then processes the search defined by the input options 166 and produces the search results 170 on the user interface 164, which may include a list of multiple queues that match the search parameters, or a listing of the requests 116 within a single queue that matched the search parameters, such as shown in FIG. 8.

In some embodiments, the GUI 150 includes traffic control options 172 that are selectable by the administrator for providing the user control input 122 for controlling all of the requests 116 of the search results, or individual queues 130 of the search results. For example, a selectable traffic control option 172 may be presented on the user interface 164 that, if selected by the administrator, provides the user control input 122 to the traffic controller 114 that designates an action that is to be performed on all of the queues presented in the search results, such as a traffic control option 172A to hold (step 148) the queues or requests of the search results 170, a traffic control option 172B to turn back (step 149) the queues or requests of the search results, and a traffic control option 172C to pass or communicate (step 147) the queues or requests of the search results to the corresponding service providers 104.

Alternatively, the administrator may select traffic control options corresponding to the individual requests 116 of the search results 170 to produce the user control input 122 to the traffic controller 104 for controlling the corresponding requests 116. For example, an administrator may select the traffic control option 172D (e.g., icon) to allow an individual request 116 to be passed or forwarded (step 147) to the corresponding service provider 104, or the administrator may select the traffic control option 172E to turn back (step 149) the request 116 to the request generator for manual fulfillment. A traffic control option 172F may also be presented on the search interface 164 to hold (step 148) an individual request 116, when selected by the administrator.

In some embodiments, the user interface 120 includes a display of a current traffic status 176 for the individual requests 116 or each queue of requests, as indicated in FIG. 2. The current traffic status 176 may indicate the most recent traffic control action performed on the individual request or queue. For example, the current traffic status 176 may indicate whether the request or queue is on hold, allowed to be communicated to the service provider, and/or turned back to the request generator.

The current traffic status 176 may be presented within the user interface 120 using any suitable technique, such as through a graphical or textual indication in the user interface 120 presented on a display, such as a display of the computing device 124. In some embodiments, the current traffic status 176 of a request 116 or queue may be presented in the GUI 150 by highlighting the traffic control option representing the current traffic status 176. Thus, for example, if the request 116A is currently on hold by the traffic controller 114, the traffic control option or icon 172F representing the hold option may be highlighted on the GUI 150, such as by making the icon more bold than the corresponding icons, as shown in FIG. 8, by providing the icon with a unique color relative to the other icons, or through another suitable highlighting technique.

The current traffic status 176 presented on the GUI 150 of FIG. 8 may indicate that a request 116 or queue has a "new" status (request 116A) indicating that the individual request or queue has yet to be communicated to the service provider by the request handler; a "processing" status (request 116B) indicating that the individual request or queue has been communicated to the service provider for processing; a "failed attempt" status (request 116C) indicating that a threshold number of failed attempts to have the individual request or queue processed by the service provider has not been reached; a "service provider failed" status (request 116D) indicating that the threshold number of failed attempts to have the individual request or queue processed by the service provider has been reached; a "completed" status (request 116E) indicating that the individual request or queue has been processed by the service provider; a "manual ticket generated" status (request 116F) indicating that the request has been turned back to the request generator for manual fulfillment and a ticket has been assigned for manual fulfillment of the request; a "manual failed" status (request 116G) indicating that a ticket assigned for manual fulfillment of the request has been rejected; and/or a "manual-complete" status (request 116H) indicating that a ticket assigned for manual fulfillment of the request has been completed.

When the traffic controller 114 authorizes the communication of requests 116 (individual or queue) based on the user control input 122, the request handler 112 may proceed with communicating the requests 116 to their corresponding service provider 104 in accordance with the service provider mapping 128 (FIG. 2) and conventional data communication protocols, as indicated at step 147 of the method of FIG. 6. The traffic controller 112 may update the traffic control status 176 of the requests 116 to "processing" in response to the communication of the requests 116 to the service providers 104. As discussed above, the service provider 104 may process the requests 116 by performing the target action on the corresponding target application 106. The service provider 104 may periodically report a status update on the processing of the request 116 to the request handler 112, as indicated at 180 of the method of FIG. 6. The traffic controller 114 may update the current traffic status 176 of the requests 116, based on the status update from the service provider 104. For example, an updated status 180 from the service provider 114 may indicate that a request 116 has been successfully processed, and the traffic controller 112 may update the current traffic status 176 to "completed" in response.

Alternatively, the service provider 104 may inform the traffic controller 114, possibly through the request handler 112, that the processing of the request has failed. Initially, the traffic controller 114 may update the current traffic status 176 to "failed attempt." After a threshold number of attempts to process the request 116 by the service provider 104, which may be indicated by subsequent status updates 180 to the traffic controller 114 from the service provider 104, the traffic controller 114 changes the current traffic status 176 to "service provider failed." For example, the traffic controller 114 may maintain a count of the updates from the service provider 104 indicating a failed attempt to process the request 116, and compare the count to a threshold value to determine when the current traffic status 176 should be updated to "service provider failed."

The notification of a failure by the service provider 104 or the corresponding target application 106 to process the request 116, allows the administrator to prevent the further transmission of similar requests 116, such as those of the same queue 130, to the service provider 104 for processing, by placing the requests 116 on hold or turning back the requests 116 to the source application 101, through the appropriate user control input 122. As a result, frequent resubmissions of the same or similar requests 116 for processing can be avoided, thereby reducing data communication congestion with the service provider 104 and the target application 106. Additionally, processing resources of the system 100, such as the processing resources of the request processor 102, the processing resources of the service provider 104 and/or the processing resources associated with the target application 106, may be conserved. Also, the time to remedy the fault with the service provider 104 or the target application 106 may exceed the time that is necessary to manually fulfill the requests 116. As a result, embodiments of the present disclosure improve the operation of the information technology based system 100.

In some embodiments, such as when faults occur with the service provider 104 and/or the target application 106, resulting in the current traffic status 176 of "failed attempt" or "service provider failed," the administrator may provide a user control input 122 to the interface 120 that directs the traffic controller 114 to turn back the requests 116 to the source application 101 for manual fulfillment, such as indicated at 149 of the method of FIG. 6. This process of sending the requests 116 back to the source application 101 for manual fulfillment, may allow the requests 116 to be processed more efficiently than if the administrator waited for the faults in the service provider 104 and/or the target application 106 to be corrected. Thus, embodiments of the present disclosure may also improve the efficiency at which the requests are processed.

In some embodiments, when a request 116 is turned back to the source application 101 for manual fulfillment or processing, the request handler 112 generates a ticket, which assigns the request 116 or the action associated therewith, to an assignee (or owner) according to rules, which may be defined by the administrator. The traffic controller 114 may update the current traffic status 176 of the request 116 to "manual ticket generated." The source application 101 may provide a notification to the assignee to manually complete the action associated with the request 116. For example, a source application (e.g., Identity Management tool like SailPoint IIQ), which includes a human approval workflow engine, can produce a work item that can be attended by the intended owner of the work item. If the source application does not have a workflow engine, then it can choose to automatically raise an equivalent ticket in Service Management systems (like ServiceNow) for manual fulfillment.

The source application 101 may update the traffic controller 114 with a status update 184 of the manual fulfillment of the request 116, as indicated in FIG. 6. The status update 184 may indicate that the request 116 could not be updated, or has not been completed, through the manual fulfillment process. In this case, the traffic controller 114 may update the current traffic status 176 of the request or queue to "manual failed." However, if the manual ticket has been completed by the assignee, the ticket generator 110 may process the manual ticket to notify the request handler 112 or the traffic controller 114 that the request 116 has been completed, and the traffic controller 114 may update the current traffic status 176 for the request 116 to "manual-complete."

Additional embodiments include computer-readable media comprising instructions, which, when executed by a processor, cause the processor to perform embodiments of the method described above.

As discussed above, embodiments of the system 100 operate to improve control of requests between computer applications and processes running on different computing systems. Additionally, embodiments of the present disclosure operate to improve the operation of the system 100 by reducing data communication congestion and conserving processing resources.

Although the embodiments of the present disclosure have been described with reference to preferred embodiments, workers skilled in the art will recognize that changes may be made in form and detail without departing from the spirit and scope of the present disclosure.

What is claimed is:

1. A request processor of an information technology based computerized system configured to process requests generated by a source application, each request defining a target action to be performed on a target application by a corresponding service provider, the request processor comprising:
   a request handler configured to communicate the requests to corresponding service providers over a network for processing of the requests; and
   a traffic controller configured to generate a user interface and perform a plurality of traffic control actions on the requests, wherein the traffic controller performs one of the plurality of traffic control actions on each of the requests based on a user control input through the user interface, the plurality of traffic control actions including allowing communication of a request to the corresponding service provider by the request handler, holding a communication of a request to the corresponding service provider by the request handler, and turning back a request to the source application for manual fulfillment,
   wherein:
      the request handler is configured to identify one of a plurality of request types for each of the requests;
      the request handler is configured to sort the requests into queues of requests having the same request type;
      the traffic controller is configured to perform any one of the traffic control actions on each of the requests individually or on the requests of a queue as a whole based on the user control input; and
      the user interface is configured to display a plurality of traffic statuses and includes a display of one of the traffic statuses for each individual request or for each queue of the requests, each displayed traffic status indicating the most recent traffic control action performed on the individual request or queue of requests.

2. The request processor of claim 1, wherein each request type is defined by one or more request parameters selected from the group consisting of a target application, a target application instance of a target application, an object of a target application instance, an object sub-type of the object, and a target action to be performed on an object sub-type.

3. The request processor of claim 2, wherein the plurality of request types includes a composite request type comprising a hierarchy of requests, and the request handler is configured to divide requests identified as the complex request type into parent and child requests.

4. The request processor of claim 2, further comprising a request transformer configured to translate each request into a common request form that includes one or more of request parameters of the identified request type.

5. The request processor of claim 1, wherein the queues are hierarchically organized based on user configurations.

6. The request processor of claim 1, wherein each queue of the requests includes requests having the same set of request parameters.

7. The request processor of claim 1, wherein the traffic controller is configured to receive a user search input through the user interface that identifies one or more request parameters, and display search results that include the requests or queues corresponding to the user search input on the user interface.

8. The request processor of claim 1, wherein the request handler associates each queue of requests to a process of the corresponding service provider.

9. The request processor of claim 1, wherein the plurality of traffic statuses includes:
 a new status, which indicates that the individual request or queue of requests has yet to be communicated to the service provider by the request handler;
 a processing status, which indicates that the individual request or queue of requests has been communicated to the service provider for processing;
 a failed attempt status, which indicates that a threshold number of failed attempts to have the individual request or queue of requests processed by the service provider has not been reached;
 a service provider failed status, which indicates that the threshold number of failed attempts to have the individual request or queue of requests processed by the service provider has been reached;
 a completed status, which indicates that the individual request or queue of requests has been processed by the service provider;
 a manual ticket generated status, which indicates that the request has been turned back to the source application for manual fulfillment and a ticket has been assigned for manual fulfillment of the request;
 a manual failed status, which indicates that a ticket assigned for manual fulfillment of the request has been rejected; and
 a manual-complete status, which indicates that a ticket assigned for manual fulfillment of the request was completed.

10. The request processor of claim 1, wherein:
 the plurality of traffic control actions includes a plurality of global traffic control actions, which are applied to all of the generated requests, the plurality of global traffic control actions including allowing communication of all of the requests to the corresponding service provider, holding communication of the requests to the corresponding service provider for processing, and turning back the requests to the source application for manual fulfillment;
 the traffic controller is configured to perform one of the plurality of global traffic control actions in response to the user control input to the user interface; and
 the user interface includes a display of the current global traffic status of the requests, which indicates the most recent global traffic control action performed on the requests.

11. A method of handling requests from source applications using a request processor implemented in an information technology based computerized system that includes a request handler and a traffic controller, the method comprising:
 receiving requests from a source application using the request handler, each request defining a target action to be performed on a target application by a corresponding service provider;
 identifying one of a plurality of request types for each of the requests using the request handler;
 sorting the requests into queues of requests having the same request type using the request handler;
 selecting one of a plurality of traffic control actions based on a user control input through a user interface, wherein the traffic controller is configured to perform the plurality of traffic control actions on the requests, and the plurality of traffic control actions include:
  allowing communication of the one or more requests to a corresponding service provider by the request handler of the system for processing of the one or more requests;
  holding communication of the one or more requests to the corresponding service provider by the request handler;
  turning back the one or more requests to the source application for manual fulfillment; and
 performing the selected one of the plurality of traffic control actions on each of the requests individually or on the requests of a queue as a whole based on the user control input using the traffic controller; and
 displaying one of a plurality of traffic statuses for each of the one or more requests on the user interface, each displayed traffic status indicating the most recent traffic control action performed on the individual request or queue of requests.

12. The method of claim 11, wherein;
 each request type is defined by one or more request parameters selected from the group consisting of a target application, a target application instance of a target application, an object of a target application instance, an object sub-type of the object, and a target action to be performed on an object sub-type.

13. The method of claim 11, further comprising translating each of the one or more requests into a common request form that includes one or more request parameters selected from the group consisting of a target application, a target application instance of a target application, an object of a target application instance, an object sub-type of the object, and a target action to be performed on an object sub-type, using a request transformer of the request processor.

14. The method of claim 11, wherein
 the plurality of traffic statuses includes:
  a new status, which indicates that the request has yet to be communicated to the service provider by the request handler;
  a processing status, which indicates that the request has been communicated to the service provider for processing;
  a failed attempt status, which indicates that a threshold number of failed attempts to have the request processed by the service provider has not been reached;
  a service provider failed status, which indicates that the threshold number of failed attempts to have the request processed by the service provider has been reached;
  a completed status, which indicates that the request has been processed by the service provider;
  a manual ticket generated status, which indicates that the request has been turned back to the source application for manual fulfillment and a ticket has been assigned for manual fulfillment of the request by the request handler;
  a manual failed status, which indicates that a ticket assigned for manual fulfillment of the request has been rejected; and a manual-complete status, which indicates that a ticket assigned for manual fulfillment of the request was completed.

15. The method of claim 11, wherein:

the plurality of traffic control actions includes a plurality of global traffic control actions, which are applied to all of the one or more requests, the plurality of global traffic control actions including allowing communication of all of the one or more requests to the corresponding service provider for processing, holding communication of all of the one or more requests to the corresponding service provider, and turning back all of the one or more requests to the source application for manual fulfillment; and the method comprising performing one of the plurality of global traffic control actions in response to the user control input to the user interface.

* * * * *